W. T. HOOFNAGLE.
METHOD OF AND APPARATUS FOR TREATING AIR AND GASES ELECTRICALLY.
APPLICATION FILED MAR. 6, 1920.
1,388,112.
Patented Aug. 16, 1921.
4 SHEETS—SHEET 2.
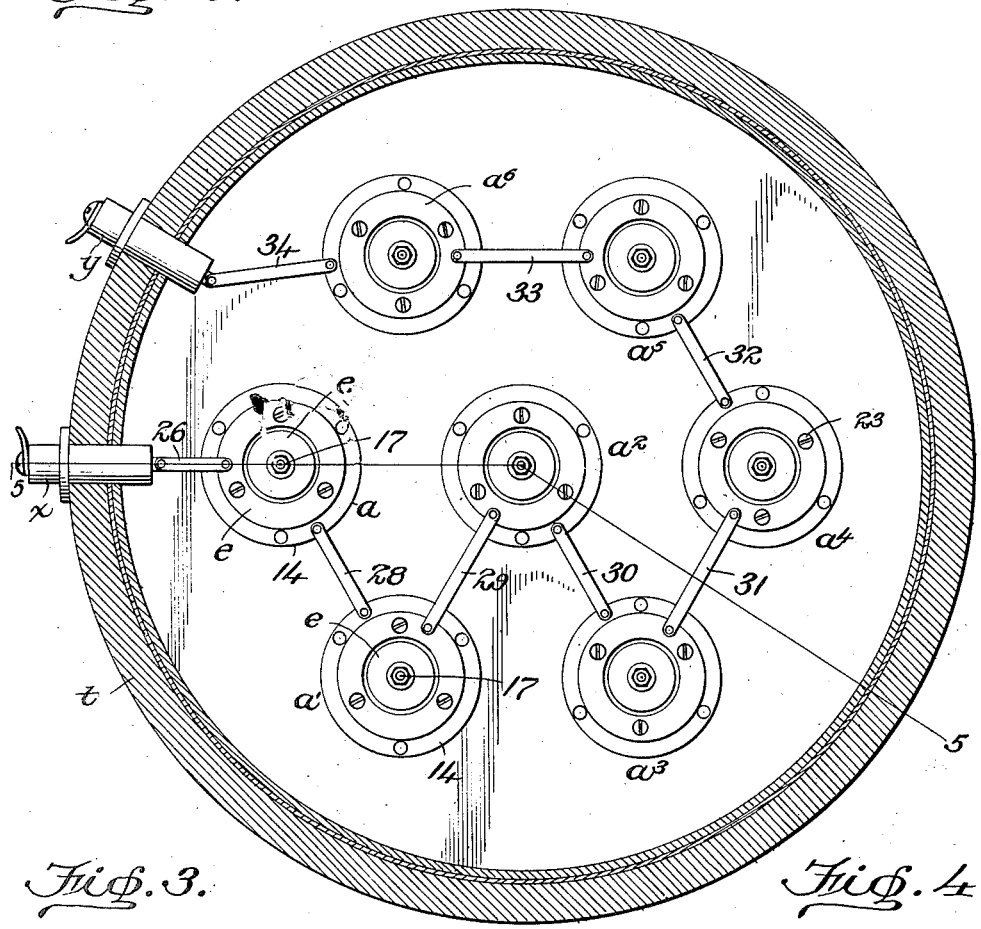
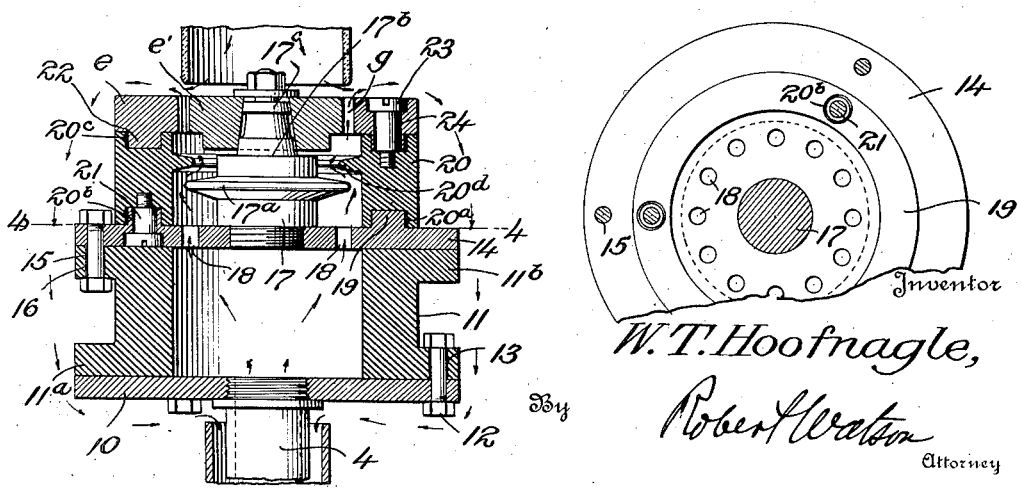

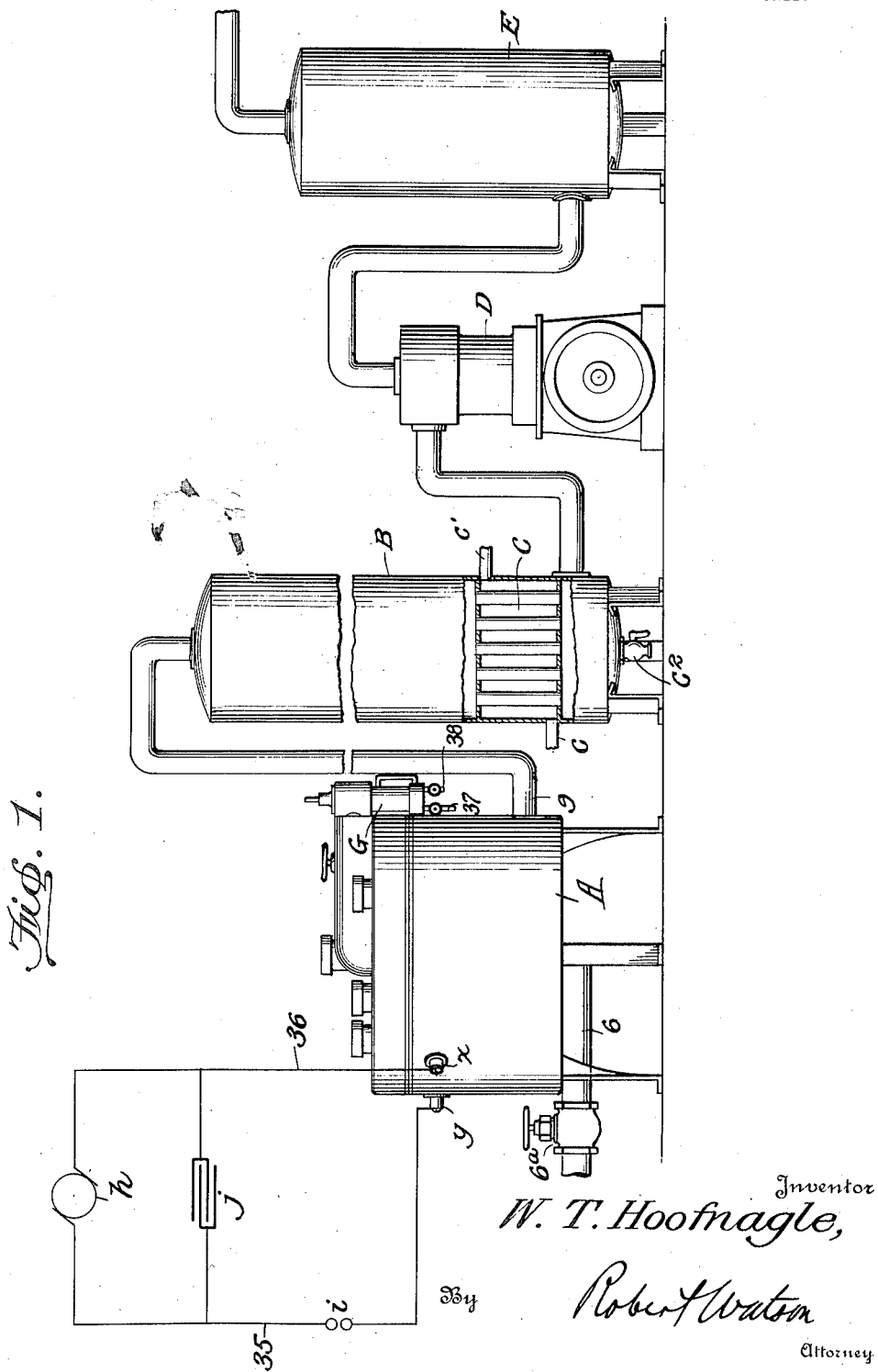

W. T. HOOFNAGLE.
METHOD OF AND APPARATUS FOR TREATING AIR AND GASES ELECTRICALLY.
APPLICATION FILED MAR. 6, 1920.

1,388,112. Patented Aug. 16, 1921.
4 SHEETS—SHEET 4.

Inventor
W. T. Hoofnagle.
By Robert Walton
Attorney

UNITED STATES PATENT OFFICE.

WILLIAM T. HOOFNAGLE, OF BLOOMFIELD, NEW JERSEY, ASSIGNOR TO ELECTRO CHEMICAL PRODUCTS COMPANY, OF BROOKLYN, NEW YORK, A CORPORATION OF NEW YORK.

METHOD OF AND APPARATUS FOR TREATING AIR AND GASES ELECTRICALLY.

1,388,112. Specification of Letters Patent. Patented Aug. 16, 1921.

Application filed March 6, 1920. Serial No. 363,807.

*To all whom it may concern:*

Be it known that I, WILLIAM T. HOOFNAGLE, a citizen of the United States, residing at Bloomfield, in the county of Essex and State of New Jersey, have invented certain new and useful Improvements in Methods of and Apparatus for Treating Air and Gases Electrically, of which the following is a specification.

This invention relates to an improved method of and apparatus for treating air, gases and vapors, and more particularly for the treatment of air in the production of nitrogen oxids. In carrying out the invention, I cause a non-disruptive electrical field to be started and maintained between electrodes, in a suitable reaction chamber, and the air is passed through this field. The resulting products are then brought in contact with a catalyzing agent, while the oxygen and nitrogen atoms are in a nascent state, and the oxids are thereby rendered stable. This catalyzing agent is preferably a current of water vapor, which is caused to mingle with the air products after passing from the electrical field. The mingled air products and vapor then pass through an oxidizing chamber and thence through a condenser, where the vapor is condensed and drawn off, with the absorbed oxids, as nitric acid. The unabsorbed products pass on from the condenser, through an exhaust pump, to an absorber, where any remaining oxids are absorbed, and thence to the atmosphere.

An important part of the invention is the method of and means for establishing and maintaining a non-disruptive field at relatively high air pressures. The electrodes are formed and arranged to permit of expansion and contraction with variations in temperature without affecting materially the width of the air gap. The gap between the electrodes is relatively long and narrow and the electrical field completely fills the gap. It is important to prevent arcing between the electrodes, as this causes a concentration of the current at one point while the air flows through untreated at other points in the gap, and arcing soon injures the adjacent surfaces of the electrodes, rendering them useless for the maintenance of a uniform field. It is not feasible to establish and maintain a non-disruptive field of considerable current density between cold electrodes at atmospheric pressure, but I have found that it is possible to establish and maintain such a field at relatively high air pressures if the electrodes are preliminarily heated to such a degree as to set up a conductive field between them when the current is applied. Thus, a non-disruptive field can be established between cold electrodes, if the pressure in the reaction chamber be reduced considerably below atmospheric pressure, and if provision is made for conserving in the electrodes the heat caused by the current, so as to create a conductive field between the electrodes by electronic emission, the air pressure can be increased, as the conductivity of the field increases, without danger of arcing between the electrodes. Or, if the electrodes be preliminarily heated by other means than the current through the electrodes, to a point where the field between the electrodes becomes conductive by electronic emission when the current is applied, a non-disruptive field may be started and maintained at relatively high air pressures. Instead of cooling the electrodes as is customary in methods of treating air by the arc process, I arrange to conserve heat in the electrodes to make the field between them more conductive. As the conductivity of the field increases with the temperature of the electrodes, the pressure at which a non-disruptive field can be maintained is limited only by the temperature which the electrodes can stand without melting or disintegrating. By providing means for starting and maintaining a non-disruptive field at relatively high air pressure, it is possible to increase the capacity of the apparatus, since more air can flow through the reaction chamber at the higher air pressures.

Another important feature of the invention relates to means for subjecting the air products to the influence of a catalyzing agent, particularly water vapor, after passing through the electrical field and while the atoms of oxygen and nitrogen are in a nascent state, to stabilize the compounds, and also to the arrangement whereby the products are cooled to condense the vapor, after passing through the oxidizing chamber. The invention also comprises certain features of construction more particularly relating to the electrodes, whereby the heat is conserved in the electrodes and the latter are arranged so that expansion and contraction may take place between them without materially varying the width of the air gap.

In the accompanying drawing,

Figure 1 is a side elevation of an apparatus constructed in accordance with my invention;

Fig. 2 is a horizontal section through the reaction chamber on the line 2—2 of Fig. 5;

Fig. 3 is a central, vertical section through one pair of electrodes and their supporting parts;

Fig. 4 is a section on the line 4—4 of Fig. 3;

Figure 5:
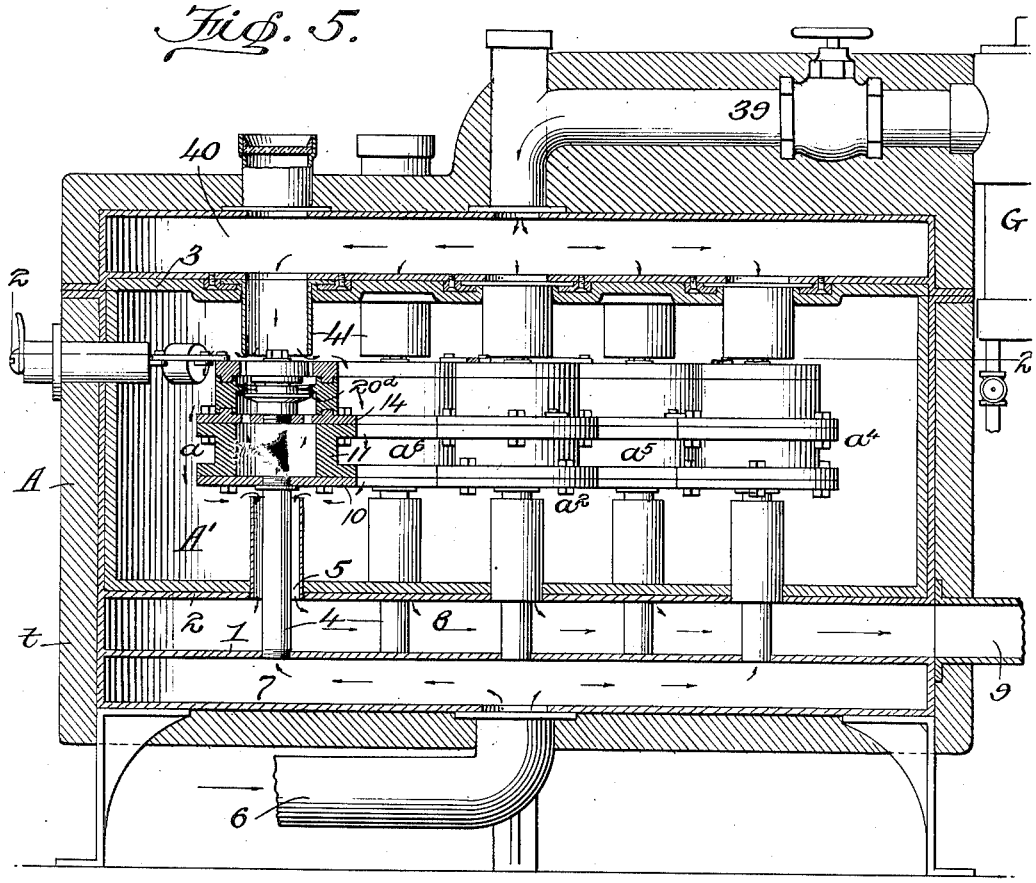
Fig. 5 is a vertical section through the reaction chamber taken on the line 5—5 of Fig. 2.
Figure 6:
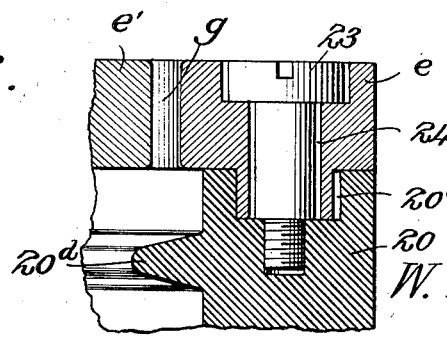
Fig. 6 is a detail view showing in section the manner of mounting the outer electrodes.

Referring to Fig. 1 of the drawing, A indicates a cylindrical vessel, containing the reaction chamber; B indicates an oxidizing chamber having in its lower part a condenser C; D indicates a pump, and E indicates an absorption chamber. In its passage through the apparatus the air is drawn, by the pump, through the reaction chamber; thence the products are carried through the oxidizing chamber and condenser, and after passing through the pump, flow into and through the absorption chamber.

Referring to Figs. 2–6, inclusive, of the drawing, the vessel A is provided with two horizontal partitions 1 and 2, in its lower portion, and with a horizontal partition 3 in its upper portion, and between the partitions 2 and 3 is the reaction chamber A'. All of the metal parts within the vessel or tank A, except the electrodes, are suitably coated or lined with rust and acid-proof materials or coatings. A series of tubes 4 are threaded into openings in the partition 1 and project through openings 5, in the partition 2, into the reaction chamber, and these tubes support the reactors $a$, as hereinafter described. An air inlet pipe 6 opens into the chamber 7, beneath the partition 1, and from this chamber the air, flowing in through the pipe 6, may pass through the tubes 4 into the reaction chamber, past the electrodes. From the reaction chamber the air flows down through the openings 5, in the partition 2, into the chamber 8, between said partition and partition 1, and thence outwardly through the pipe 9 to the oxidation chamber. The vessel A is covered with suitable heat-insulating material $t$.

The several reactors are alike in construction and a description of one will suffice for all. As shown in Fig. 3, a metal supporting plate 10, having a central opening, is fitted on to the upper end of the pipe 4, and upon this plate is secured a cylinder 11 of refractory material. This cylinder has annular flanges $11^a$ and $11^b$ at its ends, and it is secured to the plate 10 by bolts 12 which pass through the plate and through openings 13 in the lower flange, which openings are slightly larger in diameter than the bolts in order to permit of any relative movement between the plate and the cylinder, which may occur by reason of the expansion and contraction of the plate. Upon the upper end of the cylinder a metal plate 14 is secured by bolts 15, which pass through enlarged openings 16 in the flange $11^b$. The plate 14 is provided with a central opening into which is threaded a vertical post 17, and the plate is provided with an annular series of openings or perforations 18, to permit the air to flow through. The plate 14 also has an annular rib 19, on its upper side, and a cylinder 20 of refractory material has a groove $20^a$ in its lower end which fits over the rib 19, this groove, as shown, being of slightly greater width than the rib in order that the plate 14 may expand and contract without injury to the cylinder 20. The cylinder 20 is secured to the plate 14 by fillister-head machine screws 21, which extend upwardly through the rib and into the insulation, the openings $20^b$ in the plate 14 for the bodies and heads of the machine screws being slightly larger than the screws in order to permit the plate to move relatively to the screws when expanding or contracting. The upper end of the insulating cylinder 20 is formed with an annular groove $20^c$, and upon this cylinder is mounted an annular electrode $e$, having a rib 22 on its lower side which fits into the groove $20^c$, but is slightly narrower than the groove to permit the electrode to expand relatively to the cylinder. This electrode is secured to the cylinder 20 by screws 23, which pass through enlarged openings 24 in the electrode and are threaded into the cylinder 20. The screws 23 are preferably made of the same metal as the electrode. The post 17 has an annular flange $17^a$, and above said flange the cylinder 20 has an inwardly projecting flange $20^d$, these flanges overlapping one another and forming a baffle which causes the air to flow in intimate contact with the post, as well as the cylinder and to take up the heat from said parts before passing between the electrodes. The upper part of the post 17 is made conical, preferably with spaced conical portions $17^b$ and $17^c$, and a circular electrode $e'$ is provided with a central conical opening 25, which fits on to the tapering portions of the post. It is important to have the opposing walls of the electrodes equi-distant at all points and under all working conditions in order that the resistance of the gap $g$ between them shall be uniform throughout its length. By mounting the inner electrode $e'$ upon the conical post, the electrode will always fit the post closely and thus remain centered even though the electrode may expand or contact with changes in temperature. The outer electrode $e$, which is also centered about the axis of the post 17, will remain centered because of the tongue and groove connections before described between said electrode and the cylinder 20 and the plate 14.

The opposing surfaces of the electrodes are made smooth and somewhat rounding at the edges, as shown, in order to concentrate the field between the electrodes and to avoid discharges to adjacent metal parts. The electrodes are made of metal that will stand a high temperature without having the smoothness of their surfaces impaired by oxidation. For this purpose, I prefer to use pure nickel, or I may make the electrodes of a conductive metal oxid, such as oxid of iron or nickel, cast under pressure.

The course of the air through the reaction chamber is indicated in Fig. 5 by the arrows, from which it will be seen that the air flowing up through the tubes 4 passes through the cylinders 11 and 20, and thence through the gap $g$, where it is electrically treated, and the air then flows out of the reaction chamber by way of the openings 5 and passageway 8 to the pipe 9. While in the ordinary arc processes of treating air, the electrodes are cooled, in the present process the heat is retained in the electrodes as much as possible, in order to produce between the electrodes a conductive field, by ionization. Thus, the cold air coming into the chamber 7 is partially heated by the treated products flowing out through the chamber 8, and as the air passes up through the pipes 4 to the reactors, more heat is absorbed so that by the time the air reaches the gap $g$, it is pre-heated to a certain extent.

The electrodes of the several reactors are connected in series, as shown. Thus, as shown in Fig. 2, one terminal or binding post $x$ of the electric circuit is connected by conductor 26 to the outer electrode $e'$ of the reactor $a$, and the inner electrode $e$ is connected through the post 17 and plate 14, by conductor 28 to the inner electrode $e$ of the reactor $a'$, through plate 14 and post 17 of said latter reactor. Similarly, the outer electrodes of reactors $a'$ and $a^2$ are connected by conductor 29, and the inner electrodes of reactors $a^2$ and $a^3$ are connected by conductor 30. A conductor 31 connects the outer electrodes of reactors $a^3$ and $a^4$; a conductor 32 connects the inner electrodes of reactors $a^4$ and $a^5$; a conductor 33 connects the outer electrodes of reactors $a^5$ and $a^6$, and a conductor 34 connects the inner electrode of reactor $a^6$ with the binding post $y$ of the electric circuit. Thus, the several air gaps between the electrodes are connected in series. The preferred current source comprises a high tension alternating generator $h$, the brushes of which are connected to the binding posts $x$ and $y$ by conductors 35 and 36, in one of which is interposed a spark gap device $i$, and across the brush terminals is connected a condenser $j$. With this arrangement, a field characterized by intermittent electrical discharges of short duration and high current density is produced between the electrodes.

If an electric current is applied to the electrodes while the latter are cold and the air pressure is high, say at atmospheric pressure, disruptive arcing will occur between the electrodes and this will quickly blister and pit their opposing surfaces and render the electrodes useless for the production of a uniform field. In order to avoid this destructive arcing between the electrodes, I start the apparatus by first creating a partial vacuum in the reaction chamber. With a low air pressure in the chamber when the current is applied, a non-disruptive field will be produced throughout the length of each gap, and as the electrodes become heated by the current the field between the electrodes becomes conductive by ionization, and as the field becomes conductive the air pressure may be increased without causing disruptive discharges between the electrodes. In order to start the apparatus with a low air pressure, the air pipe 6 which conducts the air into the reaction chamber is provided with a valve $6^a$, by which the inflow of air can be restricted or cut off, and the operation of the exhaust pump D will then cause a partial vacuum in the reaction chamber. As the field becomes conductive, the valve $6^a$ can be gradually opened to increase the air pressure, without changing the character of the field.

As the treated air leaves the electrodes, I have found it advantageous to mingle with the treated products while the atoms of oxygen and nitrogen are in a nascent state, a current of water vapor. The water vapor has a catalyzing effect upon the gaseous atoms, combining with and making the oxids more stable. The products are carried out into the oxidizing chamber B where they travel slowly down to the condenser C. In the condenser, which is cooled by water flowing in through the pipe $c$ and out through a pipe $c'$, the moisture is condensed and drawn off through a pet cock $c^2$ at the bottom of the condenser as acid. The oxids which are not absorbed by the moisture pass onward through a pump to the absorption chamber where they are absorbed, forming nitric acid, and the products which are not absorbed pass on out to the atmosphere.

As a convenient means of supplying aqueous vapor to the products in the reaction chamber, I provide adjacent to said chamber, a vessel G for containing water and provided with suitable inlet and outlet pipes 37 and 38, by means of which a supply of water may be kept at a suitable level in said vessel. This vessel is connected by a pipe 39 to an opening in the top of the reaction chamber and the pipe is suitably jacketed, as shown, to retain heat. The heat from the reaction chamber conducted through said pipe to the vessel G keeps the water in said vessel hot, and the suction caused by the pump draws the vapor from said vessel into the chamber 40, formed between the partition 3 and the top of the reaction chamber. Tubes 41 lead from the chamber 40 downwardly into the reaction chamber and terminate immediately above the several reactors so that water vapor flowing down through the tubes 41 will mingle with the treated air products as the latter leave the air gaps between the electrodes. It is not essential to conduct the vapor into very close proximity to the electrodes, but it is preferable to do so.

Figure 7:
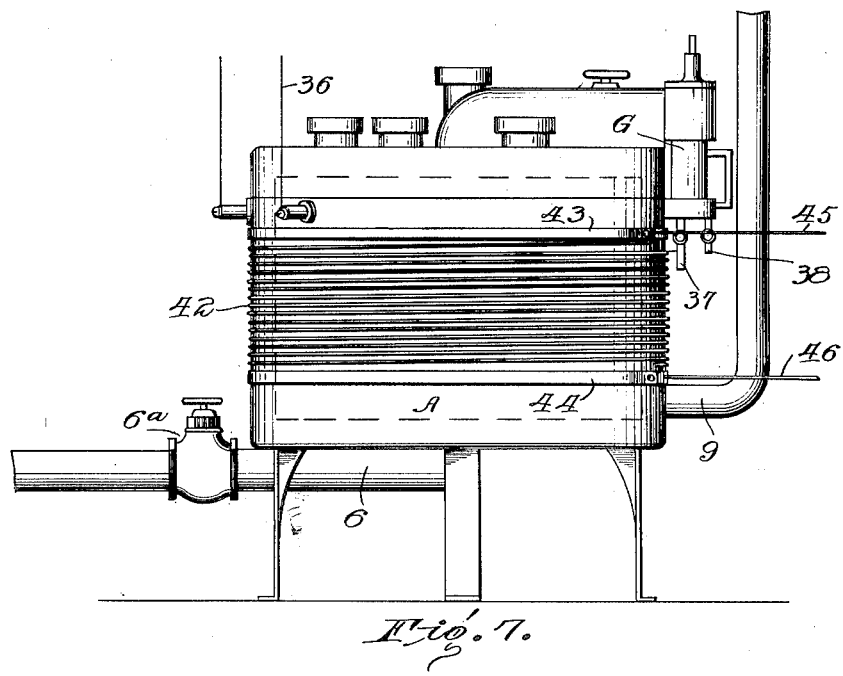
Fig. 7 is a side elevation of a reaction chamber equipped with a heating coil; and, Fig. 8 is a top plan view of the same, with the cover removed.
Figure 8:
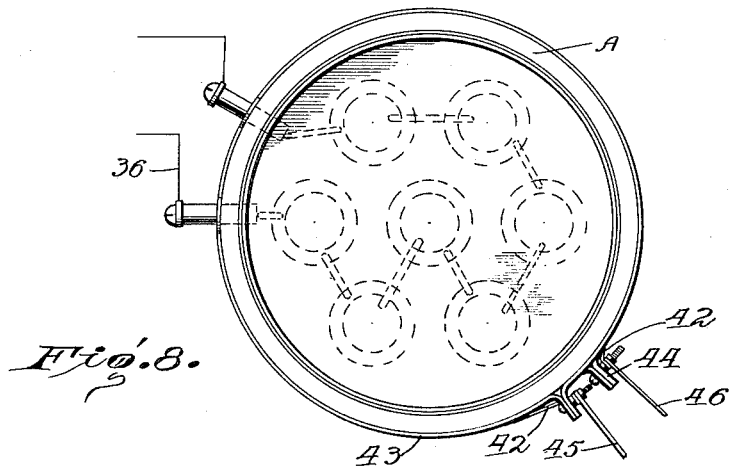

The creation of the conductive field between the electrodes before applying the current at a relatively high air pressure is important. The creation of this conductive field may be brought about by preliminarily heating the electrodes in various ways. In Figs. 7 and 8, for the purpose of illustration, I have shown the reaction chamber surrounded by a copper coil 42, the ends of which are connected to metal bands 43 and 44, by which the coil is held in place on the chamber. Wires 45 and 46 connect the coil with a suitable alternating current source (not shown), and when the current is applied to the coil an induced current is set up in the metal parts of the reaction chamber which causes it and the electrodes therein to become very hot. When the electrodes have become sufficiently heated to make a conductive field, the current from the high tension source $h$ may be applied to the electrodes and a non-disruptive electrical field will be set up between the electrodes, even at relatively high air pressures. The conductivity of the field increases with the temperature of the electrodes, and therefore the air pressure permissible without arcing depends upon the temperature that the electrodes will stand without being injured by the heat.

What I claim is:

1. The method of treating air and gases which comprises passing the air or gas through an electric field and causing the products to flow, while in a nascent state, in contact with a catalyzer.

2. The method of treating air and gases which comprises passing the air or gas through an electric field and causing the products to flow, while in a nascent state, in contact with a catalyzing vapor.

3. The method of treating air and gases which comprises passing the air or gas through an electric field and causing the products to flow in contact with a heated catalyzer.

4. The method of treating air and gases which comprises passing the air or gas through an electric field and causing the products to flow in contact with a heated catalyzing fluid.

5. The method of treating air and gases which comprises passing the air or gas through an electric field and causing a current of water vapor to mingle with the treated air while in a nascent state.

6. The method of treating air which comprises passing the air through an electrical field, causing a current of water vapor to mingle with the treated air, and cooling the product.

7. The method of treating air for the production of nitrogen oxids which comprises passing the air through an electric field, causing a current of water vapor to mingle with the treated air, passing the treated air and vapor through an oxidizing chamber and then cooling the product.

8. The method of treating air for the production of nitrogen oxids which comprises passing the air through an electric field in a partially exhausted chamber, vaporizing water in said chamber and causing the water vapor to mingle with the treated air.

9. The method of treating air for the production of nitrogen oxids which comprises passing the air through an electric field in a partially exhausted chamber, vaporizing water in said chamber, causing the water vapor to mingle with the treated air, passing the treated air and vapor through an oxidizing chamber, and then cooling the product.

10. In the treatment of air and gases electrically, the method of starting a non-disruptive electrical field at relatively high air pressures which comprises preliminarily heating opposed electrodes to create a conductive field therebetween, and passing an electric current between said electrodes.

11. In the treatment of air and gases electrically, the method of starting and maintaining a non-disruptive electrical field at relatively high air pressures which comprises heating opposed electrodes to create a conductive field therebetween, passing an electric current between said electrodes, conserving the heat caused by the current in said electrodes, and increasing the air pressure as the temperature of the electrodes increases.

In testimony whereof I affix my signature.

WILLIAM T. HOOFNAGLE.